United States Patent
Lin (10) Patent No.: US 7,194,057 B2
(45) Date of Patent: Mar. 20, 2007

(54) SYSTEM AND METHOD OF OVERSAMPLING HIGH SPEED CLOCK/DATA RECOVERY

(75) Inventor: Christine Lin, Taipei (TW)

(73) Assignee: Prolific Technology Inc., Taipei (TW)

( * ) Notice: Subject to any disclaimer, the term of this patent is extended or adjusted under 35 U.S.C. 154(b) by 0 days.

(21) Appl. No.: 11/312,694

(22) Filed: Dec. 21, 2005

(65) Prior Publication Data

US 2006/0125665 A1    Jun. 15, 2006

(30) Foreign Application Priority Data

Dec. 22, 2004   (TW)   ................. 93140084 A (51) Int. Cl.
*H03D 3/24*   (2006.01)
(52) U.S. Cl. ................. 375/375; 375/376; 375/355
(58) Field of Classification Search ................ 375/375, 375/376, 354, 355, 373; 331/10, 1 A, 11, 331/17, 18, 25; 327/144, 147, 156–159; 341/100
See application file for complete search history.

(56) References Cited

U.S. PATENT DOCUMENTS

| | | | | |
|---|---|---|---|---|
| 6,266,799 B1 * | 7/2001 | Lee et al. | ................. | 716/6 |
| 6,340,910 B1 * | 1/2002 | Saeki | ................. | 327/296 |
| 6,775,345 B1 * | 8/2004 | Song | ................. | 375/376 |
| 6,838,945 B2 * | 1/2005 | Song | ................. | 331/1 A |
| 7,010,074 B2 * | 3/2006 | Nakamura | ................. | 375/371 |
| 2002/0085657 A1 * | 7/2002 | Boerstler | ................. | 375/373 |
| 2002/0154723 A1 * | 10/2002 | Nakamura | ................. | 375/376 |
| 2004/0202261 A1 * | 10/2004 | Gregorius | ................. | 375/354 |

* cited by examiner

*Primary Examiner*—Linh Nguyen
(74) *Attorney, Agent, or Firm*—Birch, Stewart, Kolasch, and Birch, LLP (57) ABSTRACT

A system and method of high speed clock/data recovery, which is used to recover the high speed clock/data through oversampling technique, wherein the internal clock with frequency lower than the high speed data is used for data recovery. Only three clocks are used in the digital circuit without involving all the oversampling clock phases to make the design timing complicated and critical. The system and method provide a simple clock structure to implement the digital circuit of high speed clock/data recovery in a robust and easy way. Furthermore a phase selection mechanism which decides the clock phase of the high speed data is provided as well.

13 Claims, 6 Drawing Sheets

SYSTEM AND METHOD OF OVERSAMPLING HIGH SPEED CLOCK/DATA RECOVERY

BACKGROUND OF THE INVENTION

1. Field of Invention

The invention relates to a system and method of high speed clock/data recovery, and in particular to a system and method of oversampling high speed clock/data recovery.

2. Related Art

In the network communication, the trend of research and development relating to the bandwidth used for data transmission is toward the development of the Serial Link Technology of high speed and low cost, and in particular for use in high speed data transmission. In this connection, the oversampling technology is widely utilized. In this technology, multiple clock phases are used to oversample the high speed data, and then the high speed clock and data are recovered through the information of the phase of data transition.

With regard to the prior art, a technology is disclosed in the US patent publication No. 20030142773, wherein the rising and falling edges of the clock are utilized to detect and determine if the recovered clock phase needs to be updated. In each clock period, the clock is updated as soon as a clock phase change occurs. In addition, in the US publication patent No 20040022339 an oversampling circuit is disclosed to reduce the frequency of the output signals.

In practice, the difficulties encountered by the high speed data recovery circuit is that, the data must be accurately processed within the short clock period (usually a few nanoseconds). However, the technology disclosed by any of the prior cases does not provide a practical and satisfactory solution to this problem.

SUMMARY OF THE INVENTION

Due to the above-mentioned problems and shortcomings of the prior art, the invention provides a system and method for the oversampling high speed clock/data recovery, in particular a simple and reliable clock architecture, so that the high speed clock/data recovery can be fast and correctly realized in an integrated circuit.

In accordance with the system and method of the high speed clock/data recovery of the invention, an analog circuit is utilized to oversample the input data, then the oversampled data is synchronized by the internal global clock (CLK) and the inverted internal global clock. Afterwards the serial data is converted to parallel data for data transition detection. Based upon the data transition information the recovered clock and data can be found.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

The purpose, construction, features, and functions of the invention can be appreciated and understood more thoroughly through the following detailed description with reference to the attached drawings.

Figure 1:
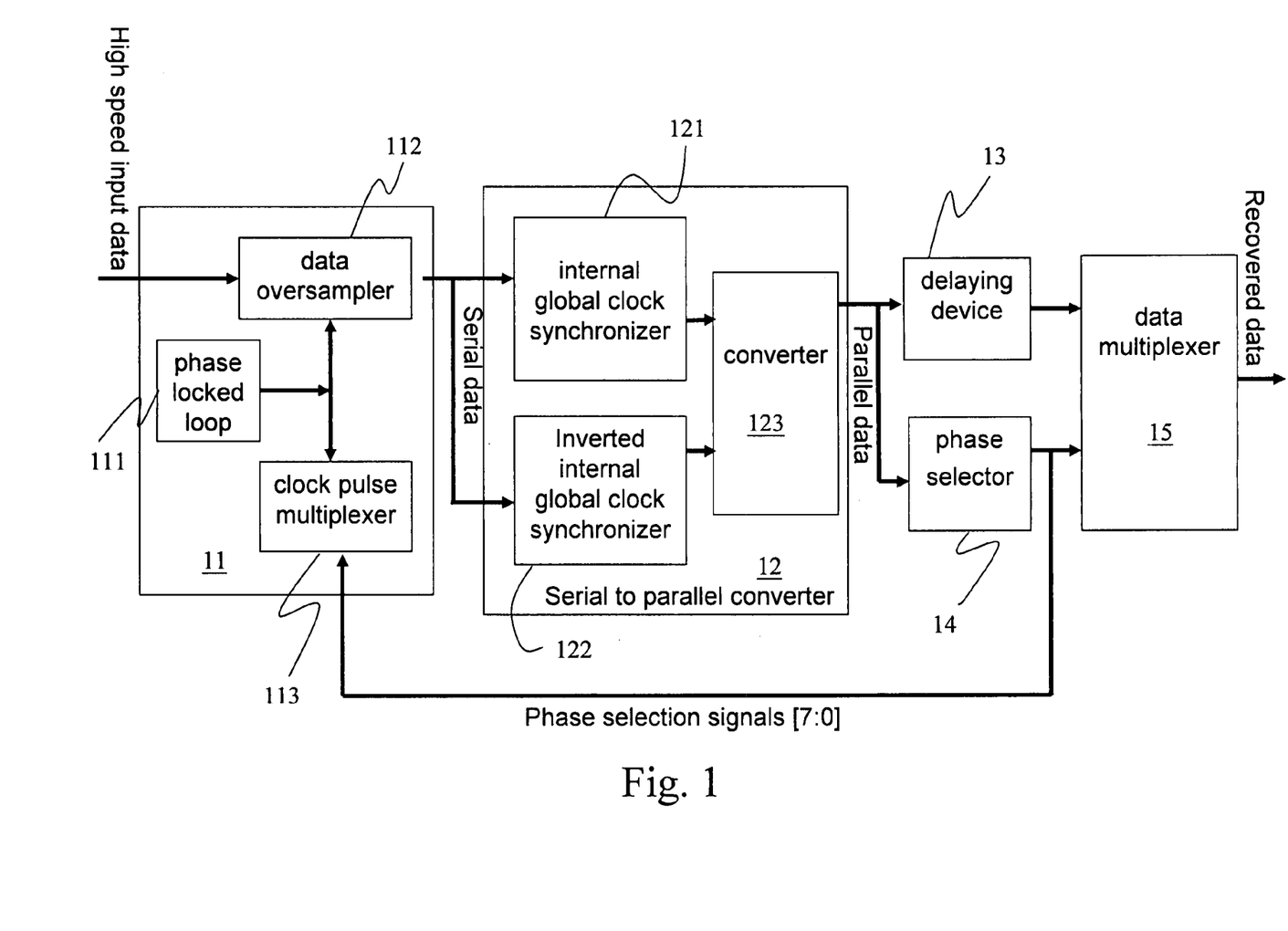
FIG. 1 is the block diagram of an oversampling high speed clock/data recovery system according to an embodiment of the invention.

Refer to FIG. 1, the block diagram of the oversampling high speed clock/data recovery system according to an embodiment of the invention.

As shown in FIG. 1, the oversampling high speed clock/data recovery system of the invention includes: an analog circuit 11, a serial/parallel conversion unit 12, a delaying device 13, a phase selector 14, and a data multiplexer 15.

The details of these devices are described as follows.

Firstly, the analog circuit 11 includes: a phase locked loop (PLL) 111, a data oversampler 112, and a clock multiplexer 113, wherein:

The phase lock loop (PLL) 111, which is used to generate $4*i$ oversampling clock phases (CLK0, CLK1~CLK4$*i$−1), wherein the oversampling frequency is M/i (M is the frequency of high speed data, i=2, 3, 4).

The data oversampler 112, which is used to oversample the high speed input data by the $4*i$ oversampling clock phases (CLK0, CLK1~CLK4$*i$−1, i=2, 3, 4) and generate $4*i$ serial data.

The clock multiplexer 113, which is used to select the clock phase from the $4*i$ oversampling clock phases based on the phase selection signals generated by the phase selector.

Secondly, the serial/parallel conversion unit 12 includes: an internal global clock synchronizer 121, an inverted internal global clock synchronizer 122 and a serial/parallel converter 123. The data generated by the data oversampler is firstly synchronized by the internal global clock synchronizer 121 and the inverted internal global clock synchronizer 122 (the synchronization principle will be described in detail later). The internal global clock synchronizer and the inverted internal global clock synchronizer synchronize $2*i$ signals respectively and output them serially. Then the data is converted by the converter into $4*i$ parallel data bus, and transmitted to the delaying device 13 and the phase selector 14 for subsequent processing.

Thirdly, the phase selector 14 is used to receive $4*i$ bits of parallel data bus, and generate $4*i$ phase selection signals according to edge detection and phase selection mechanism.

Fourthly, the delaying device 13 is used to compensate the delay caused by the processing of phase selection.

Finally, the data multiplexer 15 is used to select i bits data from the $4*i$ bits parallel data bus as the recovery data based on the phase selection signals determined by the phase selector 14.

Figure 2:
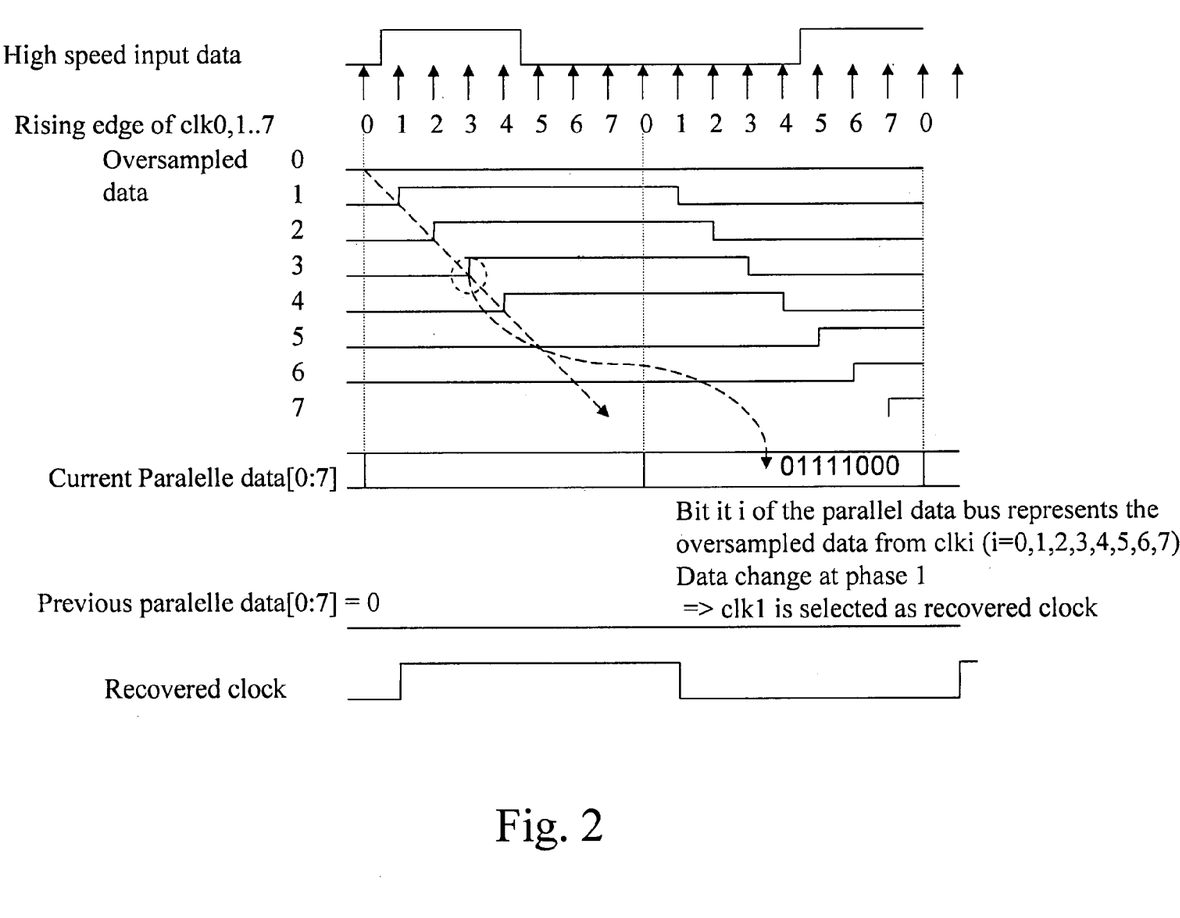
FIG. 2 is the timing diagram showing the concept of the high speed clock/data recovery mechanism.

FIG. 2 is a timing diagram showing the clock/data recovery concept according to an embodiment of the invention. By way of example, the 480 MHz USB 2.0 high speed data, wherein, if i is set to equal to 2, in an oversampling clock period of 240 MHZ, the serial data generated by a data oversampler is firstly converted into 8-bit parallel data bus through a serial/parallel conversion unit 12 as shown in FIG. 1. As such, the serial data information of the time domain is represented in the 8-bit parallel data bus. Subsequently, the phase selector 14 is used to determine the clock phase. When the values of two adjoining bits are different, that means the high speed data changes in the time domain, and the clock phase where the high speed data changes is assigned as the recovery clock phase. If there is no change in the high speed data, the clock phase of the previous period is used as the recovery clock pulse. In FIG. 2, the bit 0 and bit 1 of the 8-bit parallel data are different, thus phase I is assigned as the recovery clock pulse.

Figure 3:
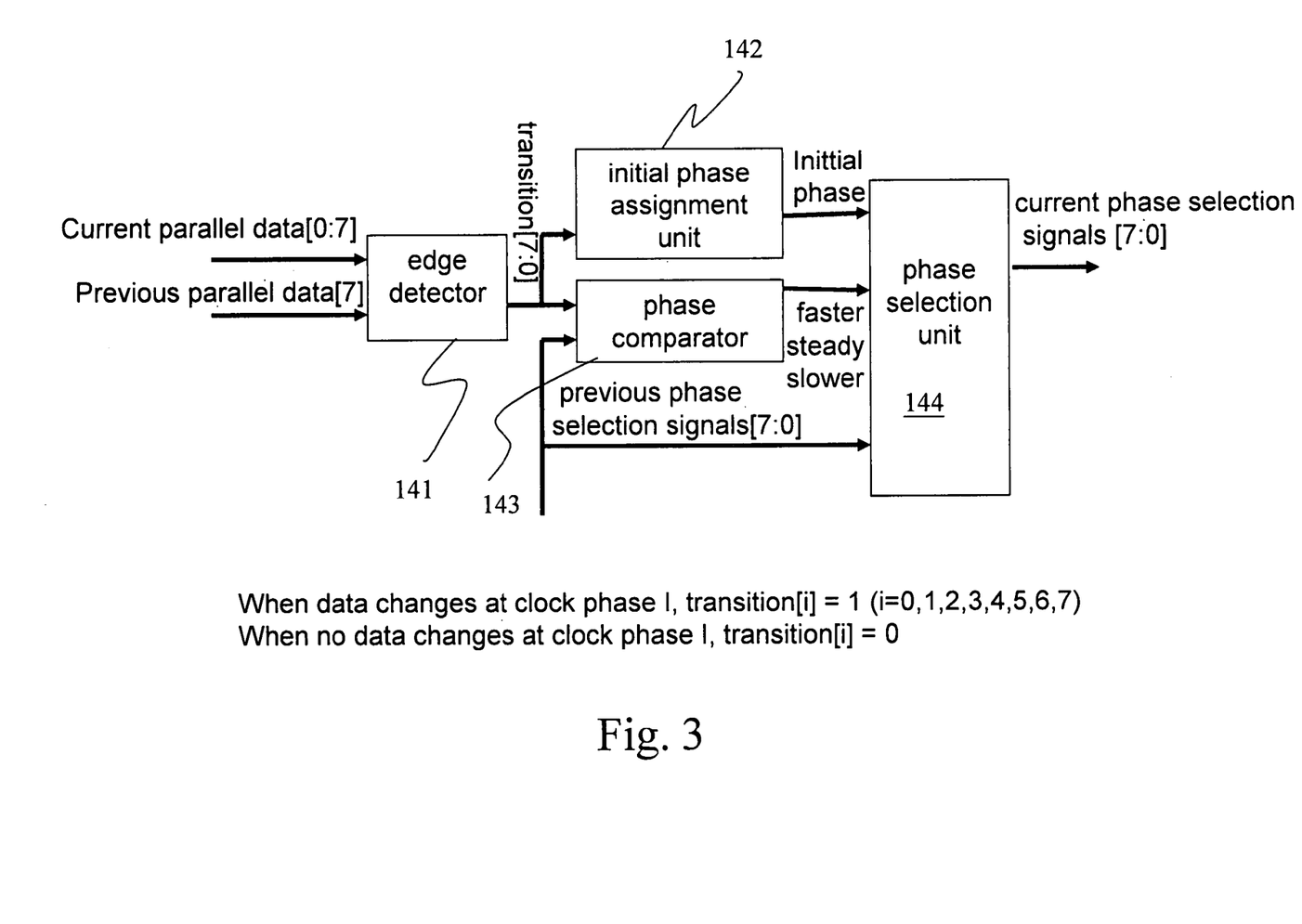
FIG. 3 is the block diagram of the phase selector of the invention.

Subsequently, refer to FIG. 3, which shows the block diagram of a phase selector of the invention. As shown in FIG. 3, the phase selector 14 includes: an edge detector 141, an initial phase assignment unit 142, a phase comparator 143, and a phase selection unit 144, and each of these devices will be described in detail as follows.

The edge detector 141 is used to detect the clock phase of the data transition. The data sampled at phase 7 of the previous clock pulse must be introduced to check if the data changes at phase 0 of the present clock period.

The initial phase assignment unit 142, which is used to assign the initial phase, namely, setting an initial phase based on the phase of data transition of the first data.

The phase comparator 143, which is used to compare the phase of the current data transition with that of the previous data transition, and generate three signals, "faster", "slower", and "steady" respectively to control the phase selection unit 144.

In the above description, "faster" means that the clock phase of the current data is faster than that of the previous period. Likewise, "slower" means that the clock phase of the current data is slower than that of the previous period. And "steady" means that the clock phase of the current data is the same as that of the previous period.

Figure 4:
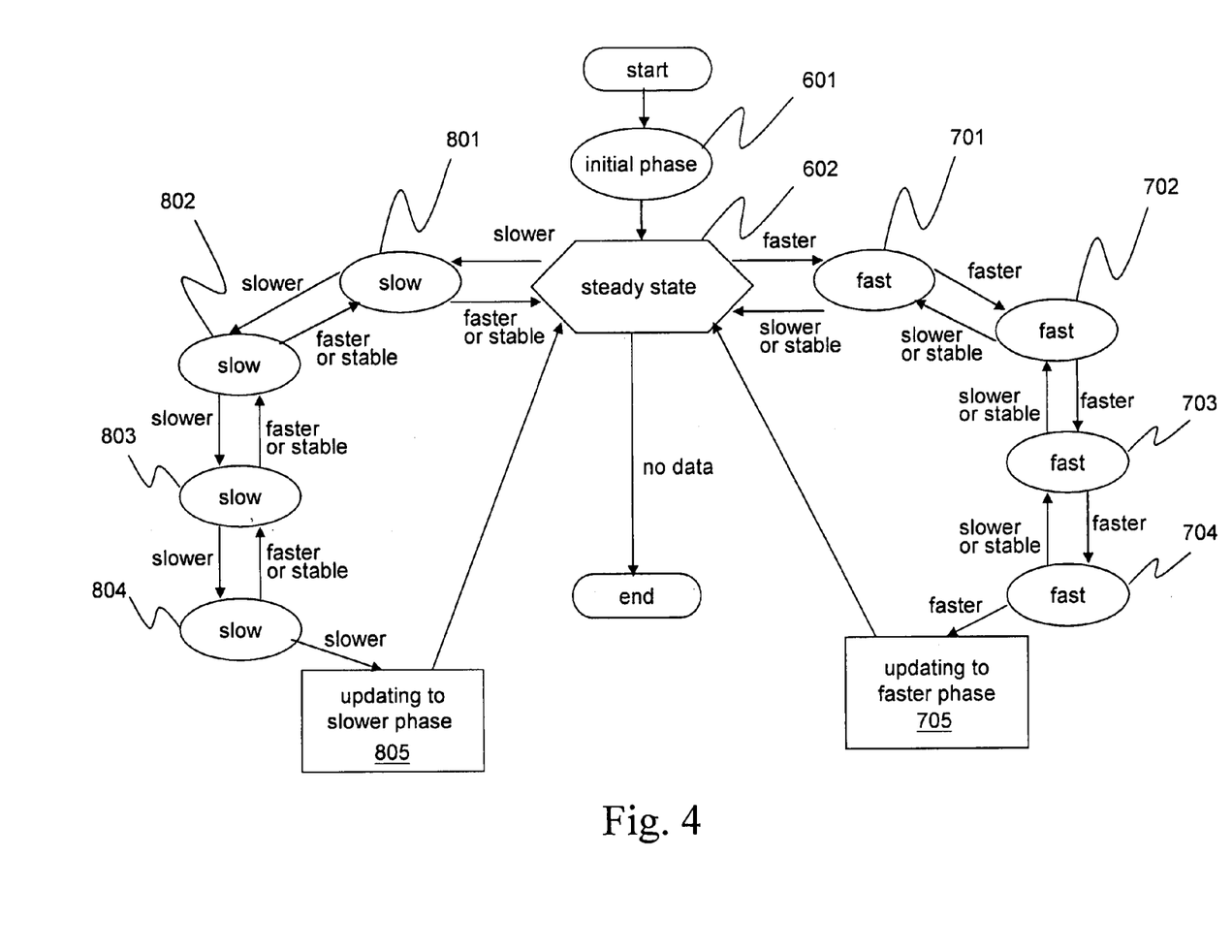
FIG. 4 is the state transition diagram showing the phase selection mechanism of the invention.

The phase selection unit 144, which is used to determine the clock phase of the high speed data based on the information of "faster", "slower" and "steady" generated by the phase comparator 143. The operation of the phase selection unit 144 is as shown in FIG. 4, which is a state transition diagram showing the phase selection mechanism of the invention.

By way of example, initially, i is set equal to 2 (i=2) (namely, there are 8 oversampling clock phases), then 8 phase selection signals are generated by this mechanism, with each phase having its own phase selection signal. Due to the jitter characteristic of the high speed data, the clock phase will be updated only after detecting faster data or slower data consecutively for five times.

The operation mechanism of the phase selection unit is as follows.

Initially, upon receiving the high speed data, the phase of the first data transition is assigned as the initial phase (state 601), and in the next clock the mechanism enters into the steady state (state 602), if the next data is faster than the previous one, the mechanism enters into state 701, and it will enter into state 705 of "updating to faster phase" only after detecting faster data consecutively for five times (states 701 to 704). If in the process of data getting faster, phase slower or steady is detected due to jitter, the state will move one step backward. On the other hand, after state 602, if data is getting slower, the similar process applies as mentioned above, and likewise, the mechanism will enter into state 805 of "updating to slower phase" only after detecting slower data consecutively for five times (states 801 to 804). Similarly, if in the process of data getting slower, phase faster or steady is detected due to jitter, the state will move one step backward accordingly. When the high speed input data is terminated, each of the respective states will go directly into the "end" state.

In the above description, in state 705, if the current phase is j (j=0, 1, 2 . . . 6), the phase after update is j+1. If the current phase is 7, the phase after update is 0.

Likewise, in state 805, if the current phase is j (j=1, 2 . . . 7), the phase after update is j−1. If the current phase is 0, then the phase after update is 7.

It should be noted that in the above-mentioned mechanism, only the clock of the high speed data with transition can be recovered. For the data constantly remaining at 0 or 1, the high speed clock can not be recovered by making use of this mechanism.

The clock phase recovery mechanism is described as above, and the selection of recovered data will be explained as follows.

By way of example, initially, i is set to 2 (i=2) for the high speed data of 480 MHZ (namely, there are 8 oversampling clocks in this framework), and the frequency of the oversampling clock is 240 MHZ, thus two data must be recovered in each clock period. Since the recovered clock is the clock phase where the data changes, as such the data sampled from "the recovered clock phase +2" and "the recovered clock phase +6" are stable, so these two oversampled data are chosen as the recovered data.

Then, the data multiplexer 15 may select two bits of data from the parallel data bus as the recovered data according to the 8 phase selection signals generated by the phase selection unit 144.

Figure 5:
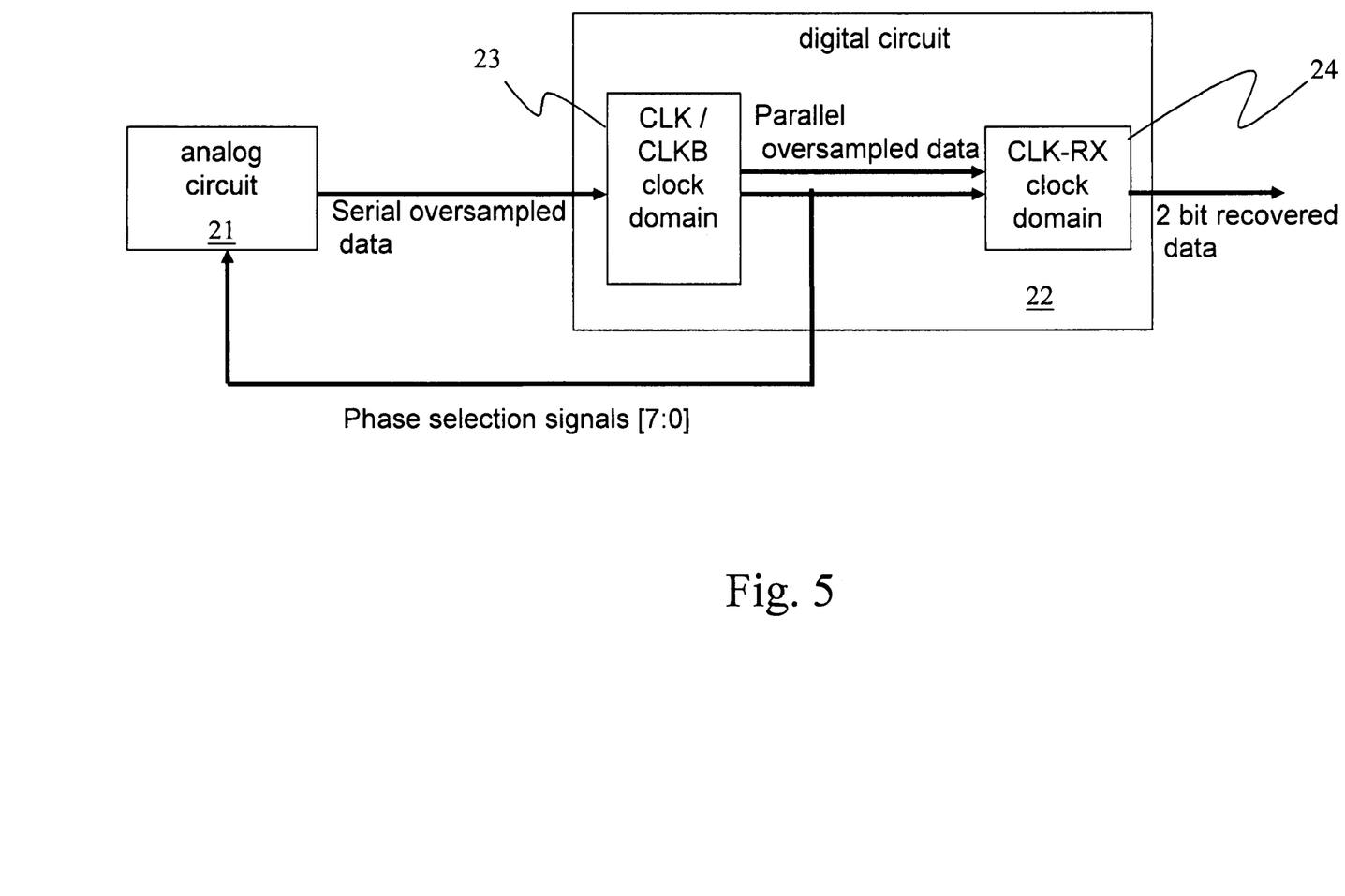
FIG. 5 is the block diagram of clock architecture of the invention.

Subsequently, refer to FIG. 5, the clock architecture of the invention. In general, the oversampling technique for the high speed clock/data recovery uses multiple clock phases with slight phase difference (usually less than 1 nanosecond). The clock architecture of the invention can avoid complicated and critical timing in the digital circuit to make the design easy and robust. In the following it will be explained.

In the digital circuit of the invention, only three clocks instead of all the oversampling clock are involved, namely, an internal global clock (CLK), an inverted internal global clock (CLKB), and a recovery clock (CLK-RX). In which, CLK is the major clock of the entire digital circuit, CLKB is only used to synchronize the oversampled data, and CLK-RX is used in the data multiplexer 15 to synchronize the recovered data. This architecture results in two clock domain crossing interfaces, wherein, the first clock domain crossing is from the 4*i oversampling clock phases to CLK and CLKB, while the second clock domain crossing is from CLK and CLKB to CLK-RX. By way of example, i is set to 2 (namely, the high speed data is oversampled by means of clock phases 0,1,2,3,4,5,6,7), the CLK and CLKB are chosen from the 8 oversampling clock phases, and the selection criteria is that the rising edge of CLK must be located between phases 7 and 0, while the rising edge of CLKB must be located between phases 3 and 4. According to this principle, the timing relation between the oversampling clock phases, CLK and CLKB is as shown in FIG. 6.

Figure 6:
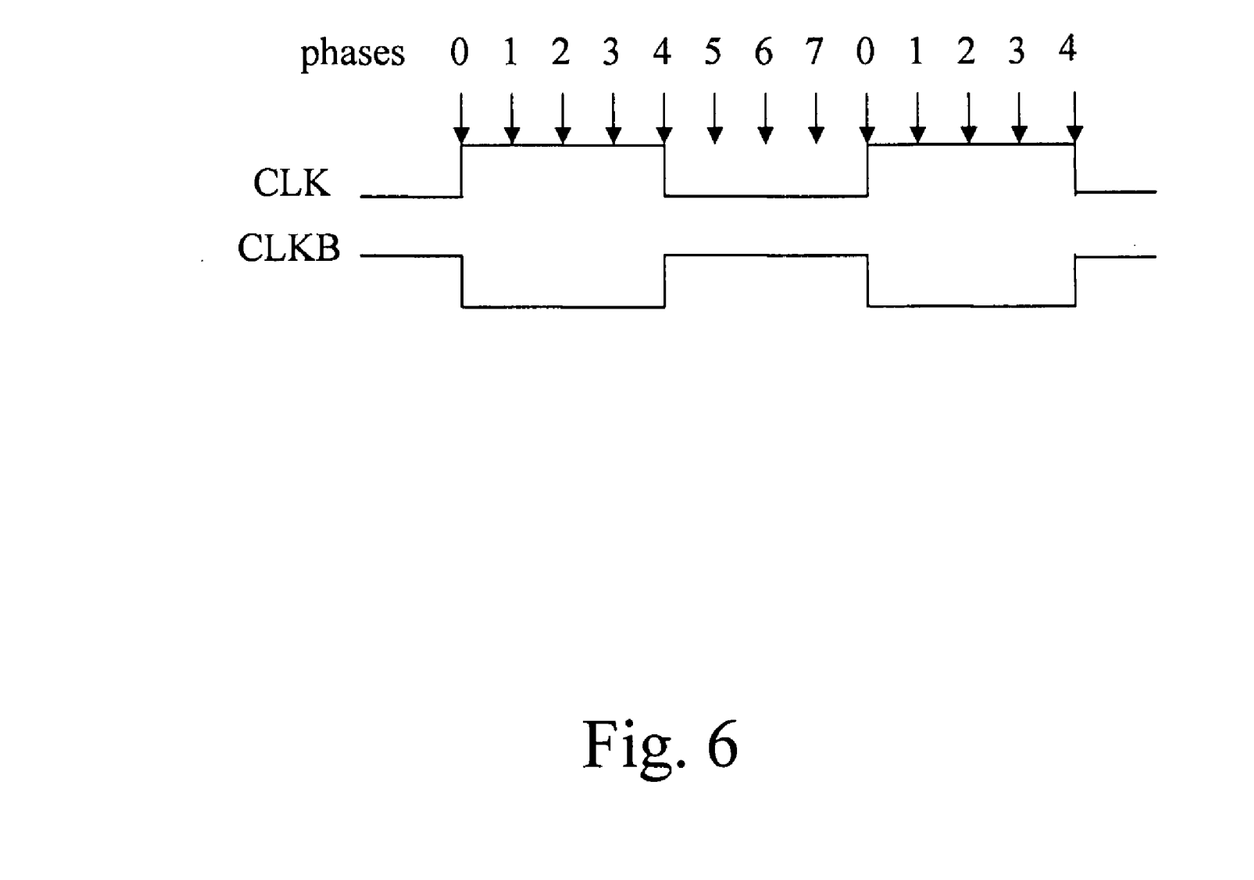
FIG. 6 is the timing diagram of the timing relation between the oversampling clock phases, the global clock CLK and the inverted global clock CLKB.

FIG. 6 is the timing diagram of the timing relation between the 8 oversampling clock phases, CLK and CLKB. The principle of its operation will be described as follows.

As shown in FIG. 6, the data synchronization principle for the first clock domain crossing interface is that: the data oversampled at phases 1,2,3, and 4 are synchronized by CLK; likewise the data oversampled at phases 5,6,7, and 0 are synchronized by CLKB.

Similarly, the data synchronization principle for the second clock domain crossing interface is that: if the recovered phase is one of the phases 4,5,6, and 7, the recovered data is chosen from the data synchronized by CLK; likewise if the recovered phase is one of the phases 0,1,2, and 3, the recovered data is chosen from the data synchronized by CLKB.

By using the above two synchronization principles, there is at least half clock period for data processing. As such this clock architecture offers a simple and robust way to realize the high speed clock/data recovery without involving complicated and critical timing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An oversampling high speed clock/data recovery system, comprising:
    an analog circuit, used to oversample the incoming high speed data, and serially output 4*i oversampled data; wherein i is an integer equals to or greater than 2;
    a serial/parallel conversion unit, including at least an internal global clock synchronizer, an inverted internal global clock synchronizer and a converter, said internal global clock synchronizer, and said inverted internal global clock synchronizer are used to synchronize the 2*i signals respectively and output them serially, and said converted converts them into 4*i parallel data bus;
    a phase selector, used to receive said parallel data bus, and generate 4*i phase selection signals based on the phase selection mechanism;
    a delaying device, used to compensate the time delay caused by phase selector; and
    a data multiplexer, used to select i bits of data from said parallel data bus as the high speed recovery data by making use of the recovered clock phase determined by said phase selector.

2. The system of claim 1, wherein the value of said i variable are preferably chosen from 2, 3, and 4.

3. The system of claim 1, wherein said analog circuit further comprising:
    a phase lock loop, used to generate 4*i oversampling clock phases, the oversampling frequency is 1/i that of the high speed data;
    a data oversampler, used to oversample the high speed input data with the 4*i oversampling clock phases; and
    a clock multiplexer, used to select the recovered clock phase from the 4*i oversampling clock phases based on the phase selection signals generated by said phase selector.

4. The system of claim 1, further comprises at least 3 clocks and two clock domain crossing interfaces.

5. The system of claim 4, wherein said three clocks are an internal global clock, an inverted internal global clock, and a recovery clock, which are used to process the 4*i oversampling data is firstly synchronized by the internal global clock and the inverted internal global clock, where the selection principle of said internal global clock is that the rising edge of said internal global clock must be located between clock phase 7 and 0, and the selection principle of said inverted internal global clock is that the rising edge of said inverted internal global clock must be located between clock phase 3 and 4.

6. The system of claim 5, wherein said two clock domain crossing interfaces process two data synchronization modes, which comprising:
    a data synchronization mode of the first clock domain crossing interface, wherein, by way of example, if i=2, then the data oversampled at clock phases 1,2,3 and 4 are firstly synchronized by said internal global clock, and the data oversampled at clock phases 5,6,7,0 are firstly synchronized by said inverted internal global clock; and
    a data synchronization mode of the second clock domain crossing interface, wherein, by way of example, if i=2, when the recovered clock phase is one of 4,5,6, and 7, the recovered data is selected from data synchronized by said internal global clock synchronizer, and when the recovered clock phase is one of 0,1,2, and 3, the recovered data is selected from data synchronized by said inverted internal global clock synchronizer,
    wherein in said two synchronization modes, the data which crosses clock domains has at least half clock period for processing.

7. The system of claim 1, wherein said converter is used to convert the serial signals to the parallel data bus.

8. The system of claim 1, wherein said phase selector further comprising:
    an edge detector, used to detect the phase of the data transition,
    an initial phase assignment unit, used to determine and assign the initial phase;
    a phase comparator, used to determine the phase change trend, generating "faster", "slower" and "steady" signals; and
    a phase selection unit, used to select the clock phase based on said phase selection mechanism.

9. The system of claim 8, further comprising an initial phase selection unit, used to assign the initial clock phase.

10. An oversampling high speed clock/data recovery method, comprising the following steps:
    receiving a high speed data; wherein i is an integer equals to or greater than 2;
    oversampling said high speed data through an analog circuit, and outputting 4*i serial data;
    receiving said serial data through a digital circuit including at least an internal global clock synchronizer and an inverted internal global synchronizer, which are used to synchronize 2*i data respectively and output them serially, and the serial/parallel converted, which converts said serial data into parallel data bus; and
    determining the clock phase of said high speed data based on said parallel data bus and selecting the i-bit data from said parallel data as the recovered data based on the phase selection mechanism.

11. The method of claim 10, wherein the value of said i variable is preferably chosen from 2, 3, and 4.

12. The method of claim 10, wherein the step of determining the clock phase of said high speed data by making use of the parallel data bus and selecting i bits from said parallel data bus as recovered data, is realized through edge detection of the data transition of the parallel data bus, and the clock phase is updated only after detecting faster data or slower data consecutively for five times.

13. The method of claim 11, wherein the step of determining the clock phase of said high speed data by making use of said parallel data bus and selecting i bits from said parallel data bus as recovered data further comprising transmitting the result of the determination to said clock multiplexer of said analog circuit so that it may select the recovered clock pulse.

* * * * *